United States Patent
Leveque

(10) Patent No.: US 11,009,845 B2
(45) Date of Patent: May 18, 2021

(54) METHOD FOR TRANSFORMING A SEQUENCE TO MAKE IT EXECUTABLE TO CONTROL A MACHINE

(71) Applicant: Christophe Leveque, Concarneau (FR)

(72) Inventor: Christophe Leveque, Concarneau (FR)

(*) Notice: Subject to any disclaimer, the term of this patent is extended or adjusted under 35 U.S.C. 154(b) by 311 days.

(21) Appl. No.: 16/268,247

(22) Filed: Feb. 5, 2019

(65) Prior Publication Data
US 2019/0243324 A1 Aug. 8, 2019

(30) Foreign Application Priority Data
Feb. 7, 2018 (FR) ...................... 18 50996

(51) Int. Cl.
| | | |
|---|---|---|
| *G06F 7/00* | (2006.01) | |
| *G05B 19/042* | (2006.01) | |
| *G06F 16/28* | (2019.01) | |
| *G06F 16/2452* | (2019.01) | |
| *G06F 8/41* | (2018.01) | |
| *G06F 40/20* | (2020.01) | |

(Continued)

(52) U.S. Cl.
CPC .......... *G05B 19/0426* (2013.01); *G06F 8/41* (2013.01); *G06F 16/24522* (2019.01); *G06F 16/282* (2019.01); *G06F 40/20* (2020.01); *G06F 40/284* (2020.01); *G06F 40/40* (2020.01); *G05B 2219/23272* (2013.01)

(58) Field of Classification Search
CPC ............. G06F 16/282; G06F 16/24522; G06F 16/2474; G06F 16/902; G06F 17/22; G06F 40/20; G06F 40/40; G06F 40/284; G06F 8/41; G05B 19/0426; G06B 2219/23272
See application file for complete search history.

(56) References Cited

U.S. PATENT DOCUMENTS

| | | | | |
|---|---|---|---|---|
| 4,499,553 A | * | 2/1985 | Dickinson | ......... G06F 16/90344 715/257 |
| 6,108,666 A | * | 8/2000 | Floratos | ................... G06K 9/62 |

(Continued)

FOREIGN PATENT DOCUMENTS

| | | |
|---|---|---|
| EP | 1 769 332 A2 | 4/2007 |
| WO | 00/23889 A1 | 4/2000 |

OTHER PUBLICATIONS

Anonymous, "Translating Natural Language to code," Apr. 1, 2013, www.transifex.com/blog/2013/translate-natural-language-to-code.

*Primary Examiner* — Mohammed R Uddin
(74) *Attorney, Agent, or Firm* — Im IP Law; Chai Im; C. Andrew Im

(57) ABSTRACT

A computer-implemented method for transforming a sequence comprising multiple words from a natural language to a machine executable sequence in real-time to control a machine. The sequence constituted by multiple characters forming words from the natural language is preprocessed by comparing the sequence to data from a database comprising classes. The sequence is searched for simple expressions and GI expressions known to be an upstream function class or a downstream function class. The sequence is dichotomized until all of the function classes contained in the sequence that are capable of resulting in dichotomies have been dichotomized. The first to the last classes of the sequence are iterated and each executable class is executed by a machine.

12 Claims, 5 Drawing Sheets

(51) Int. Cl.
G06F 40/40 (2020.01)
G06F 40/284 (2020.01)

(56) References Cited

U.S. PATENT DOCUMENTS

| | | | | |
|---|---|---|---|---|
| 6,125,342 | A * | 9/2000 | Selesky | G06F 40/253 |
| | | | | 704/9 |
| 6,243,670 | B1 | 6/2001 | Bessho et al. | |
| 6,314,399 | B1 * | 11/2001 | Deligne | G10L 15/197 |
| | | | | 704/240 |
| 7,085,708 | B2 * | 8/2006 | Manson | G06F 40/40 |
| | | | | 704/9 |
| 2005/0283467 | A1 | 12/2005 | Drukin | |
| 2008/0126092 | A1 * | 5/2008 | Kawazoe | H04N 21/47 |
| | | | | 704/246 |
| 2009/0055425 | A1 * | 2/2009 | Evans | G16B 30/00 |
| 2009/0175545 | A1 * | 7/2009 | Cancedda | G06K 9/726 |
| | | | | 382/229 |
| 2009/0299974 | A1 * | 12/2009 | Kataoka | G06F 16/84 |
| 2010/0174528 | A1 * | 7/2010 | Oya | G06F 40/268 |
| | | | | 704/10 |
| 2012/0136872 | A1 * | 5/2012 | Monro | G06F 16/334 |
| | | | | 707/741 |
| 2015/0339525 | A1 * | 11/2015 | Marcelli | G06K 9/00416 |
| | | | | 382/161 |
| 2017/0239576 | A1 | 8/2017 | Hsiao | |

* cited by examiner

| Iteration on the classes of the Sequence
-> End of identification-creation step if no more classes | ~ 2/1 |

The class is :
- CR1 or CR2 -> resume the iteration for the next class  — 2/2
- CR3 -> resume the iteration for the start of the corresponding class — 2/3
- known in the sequence-> Resume the iteration at the end of the
class for the next class — 2/4

Unknown Non-G in the Sequence
-> Extract the simple sequence of the class from the Sequence, ~ 2/5
identify or create the simple sequence in the base
Substitute la sequence from the class with its No in the
Sequence Unknown G whose Function and Parameter are known in the ~ 2/6
Sequence
-> Construct the simple sequence of the class
Identify or Create the simple sequence of the class in the base -
Insert its No upstream from its CR0
Resume the iteration at the end of the class for the next class Unknown G with Fonction and/or Parameter unknown in the ~ 2/7
Sequence
-> Resume the iteration for the next class

Fig. 4

METHOD FOR TRANSFORMING A SEQUENCE TO MAKE IT EXECUTABLE TO CONTROL A MACHINE

RELATED APPLICATION

This application claims priority to French Application No. 18 50996 filed Feb. 7, 2018, which is incorporated herein in its entirety.

TECHNICAL FIELD OF THE INVENTION

The present invention concerns a method for transforming a sequence comprising several words from a natural language in order to make the sequence executable in real=−time to control a machine.

BACKGROUND OF THE INVENTION

Certain known methods use classes, but they are very limited when it comes to interpreting a natural language given the complexity of language and the differences between one language and another.

Certain prior art documents also propose methods for interpreting a natural language, for example the document U.S. Pat. No. 6,243,670. This document describes a method that recognizes a list of object types characteristic of languages, verbs, adverbs, nouns, pronouns, etc. This method is also limited because the number of languages and the structural differences between one language and another make the described method non-universal. The described method also requires prior knowledge of a dictionary of words from the language in question and their semantic status.

Examples of documents that represent the state of the art are the following documents: WO 00/23889 which describes a method for compiling a source code comprising declarations in natural language; and US 2017/0239576 which describes a method for automatically generating a program from a natural language for specific computer applications to generate an application, such as a video game.

These state-of-the-art documents present a database including a dictionary. The dictionary has a number of heavy elements in resources. The result of the program gives a code that is fixed and cannot evolve without fundamental modification of the program. These programs require to be compiled to compile with each modification of the program.

A machine is a device or a set of devices capable of performing a certain task or fulfilling a certain function, either under the control of an operator or autonomously.

Machines are becoming more and more complex. It is increasingly inefficient to use a panel of switches or levers. For this reason, it is necessary to find a new technical solution to improve the control of machines by providing for a recognition of commands expressed in a natural language that makes it possible to control the machine.

SUMMARY AND OBJECT OF THE INVENTION

The object of the present invention is to eliminate these drawbacks.

To this end, according to a first aspect, the present invention concerns a computer-implemented method for transforming a sequence comprising several words from a natural language in order to make the sequence executable in real-time to control a machine. The method comprises at least following steps: a) preprocessing, b) dichotomy, and c) identification-creation.

a) Preprocessing:

A sequence, constituted by several characters forming words from a natural language, is compared with data from a database comprising classes. Each class comprising at least the first two of the following elements:

a number, a simple expression constituted by the character string representing the class, a class expression composed of two numbers corresponding to two other classes, either positioned in a first position, or positioned in a second position, and a direction, the direction being either upstream or downstream.

If the class also includes a class expression and a direction, then the class is called a Generalized class. If the direction is upstream, the class is called an upstream Generalized class. If the direction is downstream, the class is called a downstream Generalized class.

If it is an upstream Generalized class, then the class in the first position of its class expression is an upstream function class and the class in the second position of its class expression is a parameter class.

If it is a downstream Generalized class, then the class in the first position of its class expression is a parameter class and the class in the second position of its class expression is a downstream function class.

A function class is at least one of the following elements: an upstream function class, and a downstream function class.

A table of specific upstream or downstream function classes called Dep function classes is defined. A Dep function class is either an upstream Dep function class or a downstream Dep function class. The Dep function classes present in the table have the characteristic that any generalized class of any of the Dep function classes is known by the method to be a function class in the inverse direction from the Dep function class, called a ParDep function class, thus an upstream ParDep function class is an upstream function class and is a Generalized class of a downstream Dep function class, and a downstream ParDep function class is a downstream function class and is a Generalized class of an upstream Dep function class.

A table of hierarchical relationships is also defined, for pairs constituted by an upstream function class or a Dep function class and by a downstream function class or a Dep function class. The hierarchical relationship indicates for each of the pairs present in the table which of the two function classes of the pair is Hierarchically dominant over the other.

If in a sequence an upstream function class precedes a downstream function class or a hierarchically dominant Dep function class, and the function classes are separated by a non-empty parameter, then the non-hierarchically dominant upstream function class has precedence in the adoption of the parameter over the downstream function class or the hierarchically dominant Dep function class.

If in a sequence, a downstream function class is subsequent to an upstream function class or a hierarchically dominant Dep function class, and the function classes are separated by a non-empty parameter, then the non-hierarchically dominant downstream function class has precedence in the adoption of the parameter over the upstream function class or the hierarchically dominant Dep function class.

The database also comprises reserved classes. Each reserved class comprises a number and a simple expression, each simple expression of which is preceded by a tag.

The database comprises the following predefined elements: first reserved class, second reserved class, third reserved class, fourth reserved class, fifth reserved class.

The first reserved class, the second reserved class, the third reserved class and the fourth reserved class are hereinafter called GI classes.

The first three GI classes correspond to the first GI class, the second GI class, and the third GI class. The last three GI classes correspond to the second GI class, third GI class, and fourth GI class.

The function of the first reserved class and the fourth reserved class is to indicate in a sequence the start and the end of a Generalized class.

The second reserved class, always positioned inside a part of the sequence delimited by the first reserved class and the fourth reserved class, separates the part of the sequence into two sub-parts. The first sub-part represents an upstream function class and the second sub-part represents a parameter class, and indicates that the part of the sequence represents an upstream Generalized class.

The third reserved class, always positioned inside a part of the sequence delimited by the first reserved class and the fourth reserved class, separates the part of the sequence into two sub-parts. The first sub-part represents a parameter class and the second sub-part represents a downstream function class, and indicates that the part of the sequence represents a downstream Generalized class. A sequence or sequence part comprising GI classes is called a GI expression.

The fifth reserved class is a function class and designates any class as executable by a machine.

The preprocessing step comprises a comparison of the sequence with the data from the database. If a reserved class is recognized in a part of the sequence, then the part of the sequence is substituted by the number of the corresponding reserved class, b) Dichotomy:

The sequence is searched for the simple expressions and GI expressions known in the method to be an upstream function class or a downstream function class. The sequence is dichotomized until all the function classes contained in the sequence that can result in dichotomies have been dichotomized. For each of the upstream function classes or downstream function classes found in the sequence, the dichotomy step comprises the following:

If it is an upstream function class, and the upstream function class is Non-Dep and is at the beginning of the sequence or immediately preceded by one of the first three GI classes, and the upstream function is not at the end of the sequence and not immediately followed by one of the last three GI classes, then a part of the sequence playing the role of a parameter class for the upstream function class is identifiable, the parameter class, adjacent to the upstream function class, starts in the position following the upstream function class and its end position is identifiable by going through the positions of the sequence beginning at the start position of the parameter class, and is either:

in the position preceding the simple expression or the GI expression of a downstream function class or a Dep function class, and hierarchically dominant over the upstream function class, or in the position preceding one of the last three GI classes, it being understood that if the first reserved class is found in one position, the analysis resumes in the position following the fourth reserved class corresponding to the first reserved class found, or at the end of the sequence.

When the end position of the parameter class is thus determined, and if the start and end positions of the parameter class are different, the following are inserted into the sequence: the first reserved class in the position preceding the upstream function class, the second reserved class between the end of the upstream function class and the start of the parameter class, and the fourth reserved class at the end of the parameter class.

The insertion of these three GI classes defines in the sequence an upstream Generalized class.

If it is a downstream function class, and the downstream function class is Non-Dep and is at the end of the sequence or immediately followed by one of the last three GI classes, and the downstream function is not at the start of the sequence and not immediately preceded by one of the first three GI classes, then a part of the sequence playing the role of a parameter class for the downstream function class is identifiable, the parameter class, adjacent to the downstream function class, ends in the position preceding the downstream function class and its start position is identifiable by going backward through the positions of the sequence, beginning at the end position of the parameter class, and is either:

in the position following the simple expression or GI expression of an upstream function class or Dep function class, and hierarchically dominant over the downstream function class, or in the position following one of the first three GI classes, it being understood that if the fourth reserved class is found in one position, the analysis resumes in the position preceding the first reserved class corresponding to the fourth reserved class found, or at the start of the sequence.

When the start position of the parameter class is thus determined, and if the start and end positions of the parameter class are different, the following are inserted into the sequence: the first reserved class immediately before the parameter class, the third reserved class between the end of the parameter class and the start of the downstream function class, the fourth reserved class at the end of the downstream function class.

The insertion of these three GI classes defines in the sequence a downstream Generalized class.

The dichotomy step b) allows nesting Generalized classes. The fact that the dichotomy step allows nesting Generalized classes does not allow Generalized classes to be interlinked.

c) Identification-creation

All of the function classes and all parameter classes that are not generalized classes are substituted in the sequence by their class number, and the class number of the generalized class is inserted immediately before the first reserved class of each of the generalized classes.

For each generalized class contained in the sequence:

if the function class defined by its simple expression is unknown, then the function class is stored in the database with at least the following two pieces of information: a new number and its simple expression, if the parameter class defined by its simple expression is unknown, then the parameter class is stored in the database with at least the following two pieces of information: a new number and its simple expression, if the Generalized class defined by its simple expression is unknown, then the Generalized class is stored in the database with the following information: a new number, its simple expression, its class expression and its direction.

For a part of the sequence that is not a generalized class and is unknown, the part of the sequence is stored in the database with at least the following two pieces of information: a new number and its simple expression, the sequence obtained is called the LGI expression of the sequence.

In an embodiment, the method further comprises an execution step d), wherein it is iterated from the first to the last classes of the sequence and wherein the GI classes are ignored, each executable class is executed by a machine, the remaining iteration resuming at the end of the executable class, an executable class being defined as:
  a parameter class linked to the fifth reserved class in a generalized class,
  a Generalized class whose function class is an executable class, and
  a Generalized class whose function class is a ParDep function class of a Dep function class that is an executable class.

The claimed method enables a system to learn as it goes along, and to build its knowledge based on prior knowledge.

The method makes it possible:
to assimilate natural human languages from a limited number of examples while integrating comprehension of such languages;
to predict how new phrases should be comprehended, or in other words to deal with unknown sequences. And thus, to correctly call machine control subroutines;
to adapt to changes in linguistics or comprehension; and
to learn several languages simultaneously.

All of which combines to create a universal and efficient man-machine interface.

The claimed method makes it possible to understand an unknown sequence in order to apply it to control a machine.

The claimed method is non-resource-intensive and can be implemented locally (without an internet connection) and run by a computer.

A computer is understood include a processor and to mean a programmable information processing system or device that operates by sequentially reading a set of instructions organized into programs.

The following examples are considered to be computers having a processor or processing unit: a digital tablet, a mobile telephone, particularly of the "smartphone" type, a smart watch, smart glasses, a remote control, headphones, a virtual reality headset, a smart TV, a game console, or a modem/router.

In real-time, it is meant that the characters are transmitted or collected b without waiting for the end of the process treatment. For example, characters are transmitted in writing or by the dictation of a voice transmitted in real-time. The claimed method is capable of driving a physical machine at a speed adapted to the evolution of the machine.

Database is defined as physical memory. The database makes it possible to store and retrieve all raw data or information related to the character or characters of a sequence.

The resulting advantages of the process are multiple:

System learning ability conferred to the user. By inserting in a text to learn the classes IG, the user thus controls the understanding of the process. Once a text has been learned by the process, it will be able to reproduce, for different examples, the dichotomy and this according to its learning. In other words, it will be able to re-insert itself these classes IG in the text that is submitted to it without IG. This dichotomy using GIs reflects the understanding of the system and allows the correct execution of the text/sequence/class being processed. In other words, the IG classes define a method of writing comprehension!

It should be noted that IG classes are visible and easily readable by the user when inserted into a text (a sequence/class). And this means for the user an extremely reduced learning.

The user here does not need to be a computer scientist to evolve the process, i.e., to educate him.

Possibility for the user to see and verify everything the process has learned and how he understood it. This allows the user to have full control over the knowledge of his system—a point that is particularly important at this time.

Possibility of easily correcting said understanding of the method. It suffices to recall the misunderstood sequence in its IG form (the text with its GIs) and to change the position or meaning of the erroneous IGs. The system will then re-learn the sequence with the new understanding.

Universal in principle (independent of the language treated) and therefore no dictionary or rules related to the language and other specific characteristics but also several languages can coexist simultaneously in the process.

This is a fundamental difference—in the state-of-the-art examples, the systems or methods described require pre-knowledge of languages or access to a remote dictionary (vocabulary and semantic structure elements, i.e., hundred or thousand instances per language) to work.

While the process of the claimed invention pre-knows only four classes GI to semantically structure the texts that are submitted to it and whatever the language used! The current knowledge is built from the previous knowledge, i.e., "over water" and according to needs. The interpretation is real time.

No compilation needed to operate nor any programming operation, freezing the system.

The claimed method is made extremely light, allowing it to operate with very limited resources, allowing it to be shipped directly into the machine without external means of communication necessary.

For example, and for the simple case of a small car described below, the claimed method will require only about thirty instances in the database.

By inserting four specific (reserved) classes, called GI classes, into the sequences, the claimed method makes it possible to show how a sequence is comprehended by the system, and allows the user to "see" this comprehension. These GI classes also potentially enabling the user to easily correct the comprehension.

The claimed invention is advantageously implemented according to the embodiments and variants described below, considered individually or in any technically feasible combination.

In an embodiment, the updating of the Dep function table in the dichotomy step b) is determined based on the following conditions:
  if an upstream function class is applied to a first upstream number corresponding to the number of recurrences of the upstream function class of the upstream Generalized classes of the database, and the upstream function class is applied to a second upstream number corresponding to the number of recurrences of the Generalized classes that are downstream function classes, and the second upstream number is at least greater than half of the first number, then the upstream function class is an upstream Dep function class, or if a downstream function class is applied to a first downstream number corresponding to the number of recurrences of the downstream function class of the downstream Generalized classes of the database, and the downstream function class is applied to a second downstream number corresponding to the number of recurrences of the Generalized classes that are upstream function classes, and the second downstream number is at least greater than half of the first number, then the downstream function class is a downstream Dep function class.

This feature enables the claimed method to update the Dep function table, and thus to function without having prior knowledge of this table.

In an embodiment, in the dichotomy step b), the claimed method comprises the following elements: if an upstream function class is earlier in a sequence than a downstream function class, then the hierarchical relationship between the upstream function class and the downstream function class is evaluated as follows:

if the upstream function class is applied to an upstream number corresponding to the number of recurrences of the upstream function class of the upstream Generalized classes of the database in which the parameter classes are downstream Generalized classes whose function is the downstream function class, and the downstream function class is applied to a downstream number corresponding to the number of recurrences of the downstream function class of the downstream Generalized classes of the database in which the parameter classes are upstream generalized classes whose function is the upstream function class, and:

if the upstream number is greater than the downstream number, then the upstream function class is hierarchically dominant over the downstream function class, or if the downstream number is greater than the upstream number, then the downstream function class is hierarchically dominant over the upstream function class, or otherwise, there is no hierarchical relationship between the upstream function class and the downstream function class.

The evaluation enables the claimed method either to update the table of hierarchical relationships between the functions, or in the dichotomy step b) if executed in real time, to substitute for the table of hierarchical relationships, and thus to function without having prior knowledge of the table of hierarchical relationships.

In an embodiment, in the dichotomy step b), the claimed method includes the following elements:

an upstream list number being obtained by gathering the upstream numbers for each of the pairs constituted by an upstream function class belonging to the upstream function class list and a downstream function class belonging to the downstream function class list, a downstream list number then being obtained by gathering the downstream numbers for each of the pairs constituted by an upstream function class belonging to the upstream function class list and a downstream function class belonging to the downstream function class list, a hierarchical relationship being defined for the upstream function class list and the downstream function class list as follows:

if the upstream list number is greater than the downstream list number, then the upstream function class list is hierarchically dominant over the downstream function class list, if the downstream list number is greater than the upstream list number, then the downstream function class list is hierarchically dominant over the upstream function class list, otherwise, there is no hierarchical relationship between the upstream function class list and the downstream function class list.

If an upstream function class comes earlier in a sequence than a downstream function class and there is no direct hierarchical relationship between the upstream function class and the downstream function class, and if either or both of them are ParDep function classes, then the hierarchical relationship of the list of upstream ParDep function classes of the same downstream Dep function class of the upstream function class, if the latter is a ParDep function class, and of the list of downstream ParDep function classes of the same upstream Dep function class of the downstream function class if the latter is a ParDep function class, is evaluated.

The implementation of this feature, which implies stationarity/consistency of the hierarchies for all Pardep functions of the same Dep function relative to other functions, allows the method to increase the dichotomies in accordance with the proper comprehension of a sequence.

In an embodiment, in the dichotomy step b), if an upstream function class comes earlier in a sequence than a Dep function class that is also upstream, the hierarchical relationship of the upstream function class and the list of all the downstream ParDep function classes of the upstream Dep function class is evaluated. In the case of an upstream function, the following option is added into the determination of the end position of the parameter of the upstream function: i.e., the position preceding the simple expression of an upstream Dep function class that is hierarchically dominant over the upstream function class.

In an embodiment, in the dichotomy step b), if a downstream function class is later in a sequence than a Dep function class that is also downstream, the hierarchical relationship of the downstream function class and the list of all the downstream ParDep function classes of the downstream Dep function class is evaluated. In the case of a downstream function, the following option is added into the determination of the start position of the parameter of the downstream function: i.e., the position following the simple expression of a downstream Dep function class that is hierarchically dominant over the downstream function class.

The implementation of this feature anticipates the appearance of a downstream ParDep function later in the sequence than an upstream function and allows the application of the hierarchy of the upstream function with the downstream Pardep functions of the upstream Dep function. Consequently, increasing the capacity of the method to predict how a new sequence must be dichotomized, and thus comprehended.

In an embodiment, in the identification-creation step c), if the generalized class is known, its class expression and its direction are updated. Thus, for each Generalized class, the update makes it possible both to correct the comprehension of a sequence by using the GI classes directly in the sequence, and to apply the most recent hierarchies, thereby correcting errors in the comprehension of previously learned sequences. The system can therefore evolve continuously.

In an embodiment, the second upstream number is at least greater than two thirds of the first upstream number, and the second downstream number is at least greater than two thirds of the first downstream number.

This feature, by raising the decision threshold for the majority rule in the definition of the Dep function classes, reduces false interpretations of Dep functions and hence dichotomy and comprehension errors, at the cost of only a few additional learning sequences.

In an embodiment, in the dichotomy step b), during the search for function classes in the sequence, the dichotomy step b) also entails that if a function class is found in the sequence and the GI expression of the function class contains other function classes, then the function class is processed before the other function classes.

This feature, by giving priority to the functions whose expressions are the largest, allows the claimed method to actually consider function classes in a sequence to be generalized classes themselves, and consequently improves the comprehension capacity of the claimed method. Such cases are common in certain languages.

In an embodiment: in the preprocessing step a), the database also includes a sixth reserved class. The sixth reserved class is a downstream function class and designates any Dep function class as an equivalence function if the Dep function class is found to be a parameter in a generalized class whose function is the sixth reserved class. Thus, any parameter class of a generalized class whose function is the ParDep function class of a Dep and equivalence function class has as an equivalent class the parameter class of the Dep function class in the generalized ParDep function class.

In the execution step d), if a class is found in the sequence and there is a known generalized class whose parameter is the class and whose function is a ParDep function class of a Dep and equivalence function class, then the LGI expression of the class is substituted in the sequence by the LGI expression of its equivalent class. The iteration resumes at the start of the class. The LGI expression of the equivalent class starts with the number of the class and is obtained through iteration by having all the numbers of the generalized classes of the LGI expression of the class followed by the number of the first GI class, then by the number of the first class of the class expression of the generalized class, then by the number of the second GI class if the class is an upstream generalized class or by the number of the third GI class if the class is a downstream generalized class, then by the number of the second class of the class expression of the generalized class, then by the number of the fourth GI class.

These features together make it possible to transform any class into another class, and in particular, any sequence representing an order written in a natural language into a class executable by a machine.

In an embodiment, in the dichotomy step b), if there is no hierarchical relationship between two function classes, then for each of the two function classes, the list of related function classes is searched for in the database. The recurrence of each function class is then compared in order to evaluate the hierarchy between these two lists. The list of classes related to a class being defined as the list of classes that are a parameter class within generalized classes, the function classes of which are also applied to the class within a generalized class.

This feature makes it possible to name and categorize classes sharing various characteristics, and thus, by naming a new class in the same category, allows it to benefit from the hierarchies already learned for the other classes in the category.

In an embodiment, in the preprocessing step a), if the reserved class tag followed by a number is found, then this expression is substituted in the sequence by the number of the class with the same number.

This feature makes it possible refer to any class known to the database in a sequence.

BRIEF DESCRIPTION OF THE FIGURES

Other advantages, objects, and features of the present invention emerge from the following description, provided for explanatory purposes and in no way limiting, in reference to the attached drawings, in which:

FIGS. 2-5, in flow chart forms, show the details of the steps implemented in accordance with an embodiment of the claimed method that is the subject of the claimed invention.

DESCRIPTION OF EXEMPLARY EMBODIMENTS OF THE INVENTION

Figure 1:
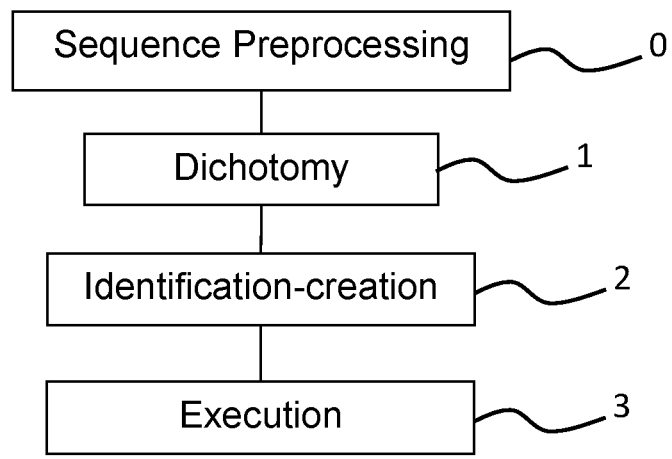
FIG. 1, in flow chart form, shows the steps implemented in accordance with an embodiment of the method that is the subject of the claimed invention.
Figure 2:
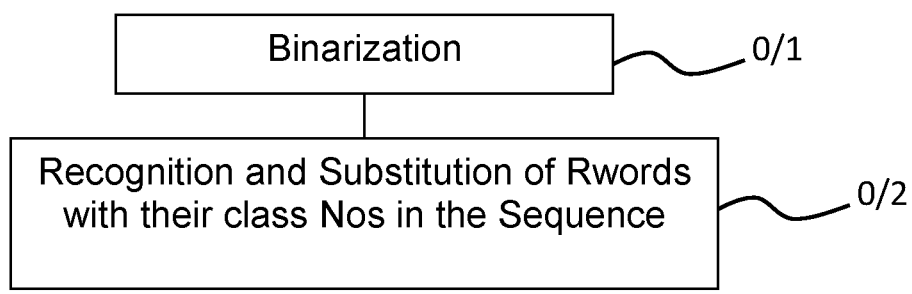
Figure 3:
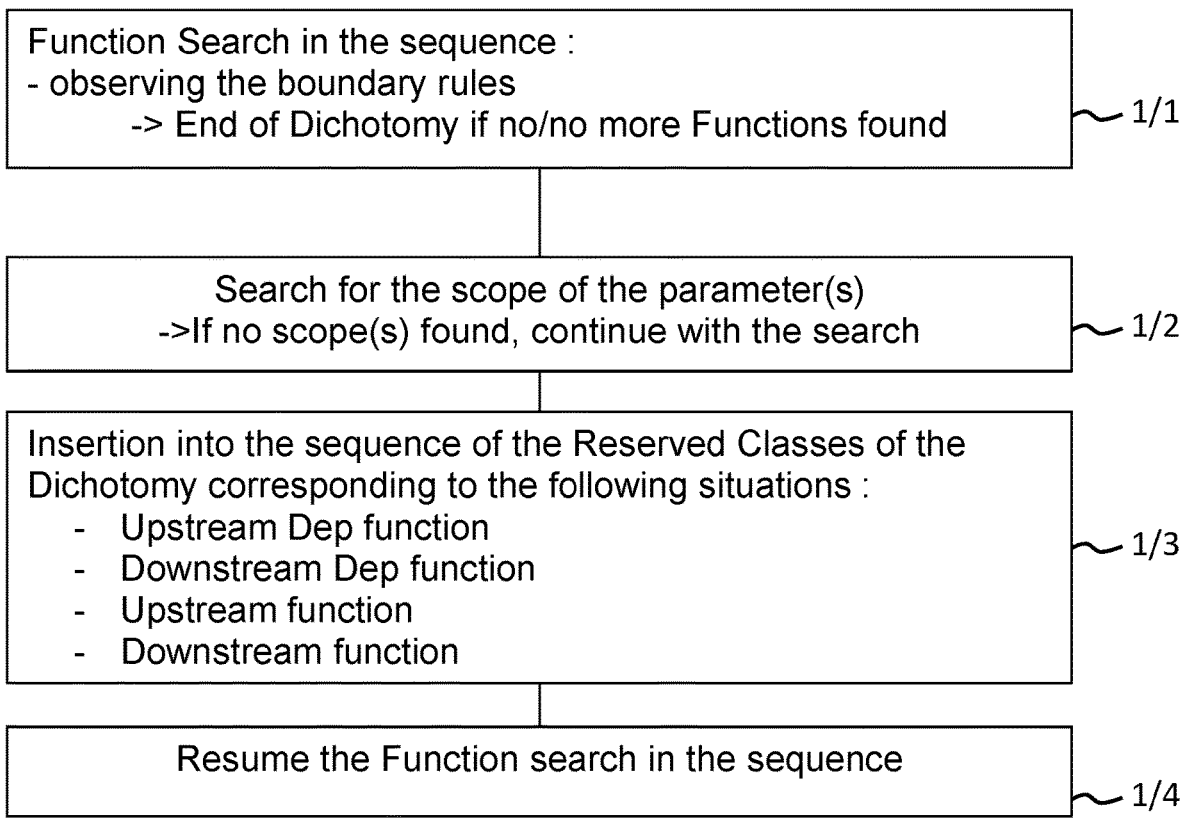
Figure 5:
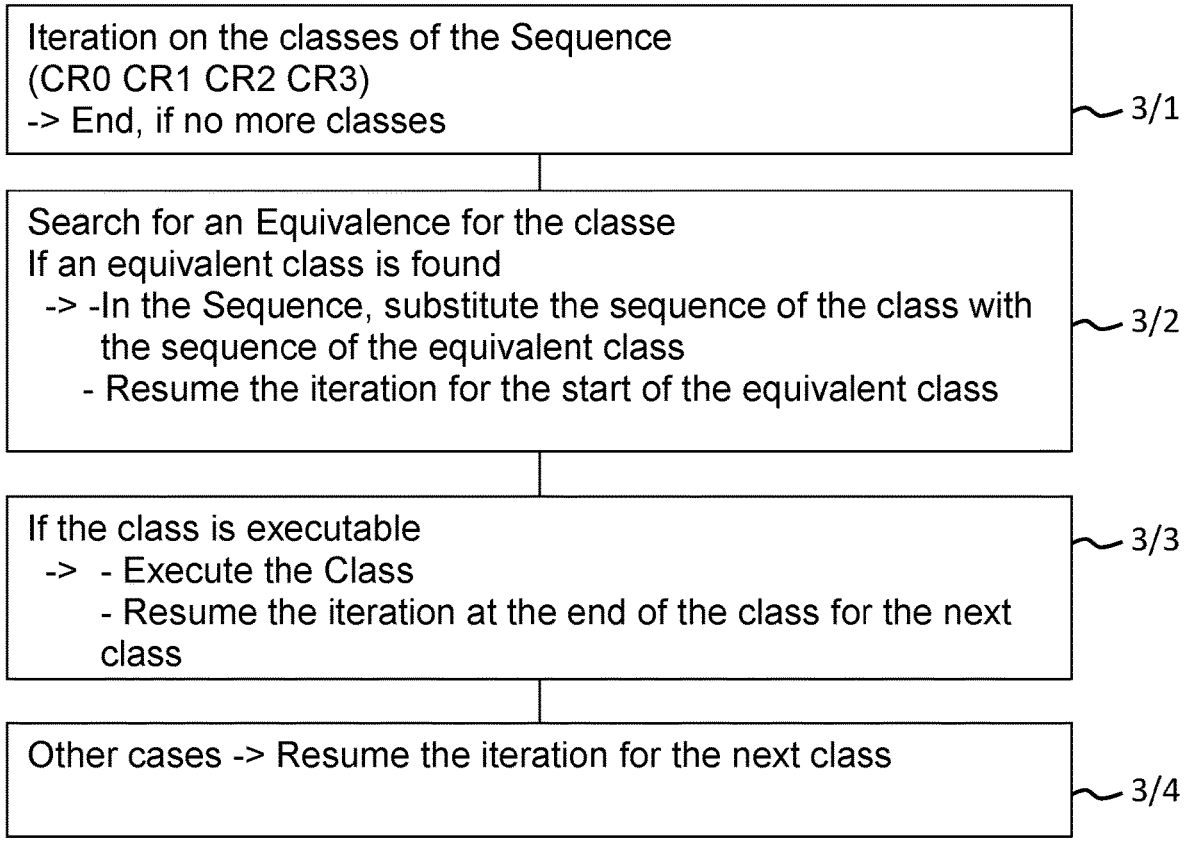

The following terms are used in an example below:

Several terms will be used hereinafter, and their definitions are as follows:

"go straight" is the English terminology for "vas tout droit" in French;

"is a verb of equivalence" is the English terminology for "est un verbe d'équivalence" in French;

"make a U-turn and stop" is the English terminology for "fait demi tour and arrête toi" in French;

"means" is the English terminology for "signifie" in French;

"move back" is the English terminology for "marche arrière" in French;

"north" is the English terminology for "nord" in French;

"quickly" is the English terminology for "rapidement" in French;

"turn left" is the English terminology for "tourne à gauche" in French;

"turn right" is the English terminology for "tourne à droite" in French;

"setengine" is the English terminology for "sens moteur" in French;

"setwheel" is the English terminology for "position roue(s)" in French; and

"south" is the English terminology for "sud" in French.

Hereinafter, what appears in brackets { . . . } is what is entered into a computer and constitutes the class expressions.

The Concept of a Sequence

A sequence is defined as being a series of elements entered and processed one after another. In this case, a sequence will be understood to be a series of numbers. An order such as {turn right}, which is a character string, is actually a series of numbers—coded using either the ASCII (American Standard Code for Information Interchange) or the Unicode (computer standard enabling text exchanges in various languages) table—and therefore {turn right} is in fact a sequence.

The essential function of the method is to recognize and process sequences.

The Concept of a Class

A database will hold the sequences processed by the method. The method will assign a number (No) to each of these sequences, this No is called a class No, or more simply, a "class."

A class can also be written in the form of other classes. In other words, a sequence can be written from sequences that are already known.

Example

If in the base, we have two classes C1={turn} and C2={right}, then the class C3={turn right} can also be written C3=={C1C2}, {C1C2} being the sequence constituted by the class C1 and the class C2.

The Concept of Functions and Parameters

In the sequences, the classes can play the role of a Function or a Parameter.

Example

If we add into the base the class C4={left} then the class CS={turn left}, can also be written CS=={C1C4}.

We can therefore teach the claimed method that C1={turn} is a function that has two parameters: C2={right} in the class C3 and C4={left} in the class CS The Concept of Reserved Words Certain sequences have a particular meaning known to the method.

These sequences will be called "Reserved Words" (Rwords)

To make them recognizable, and by convention, they always begin with the character "^".

Just like the other sequences, these Reserved Words are assigned a class No.

These Reserved Classes can be used in the sequences and are immediately recognized by the method during the preprocessing phase.

Example previously, we have taught the method that there are four reserved classes: CR0={^[ }, CR1={^»}, CR2={^«} and CR3={^]}.

These four classes known to the method allow us to establish the roles (Function or Parameter) played by the classes in a sequence.

The following are also used: for CR0, the first reserved class {^[ }; for CR1, the second reserved class {^»}; for CR2, the third reserved class {^«}; and for CR3, the fourth reserved class {^]}.

The figures in flow chart form serve to illustrate the following description.

The Concept of a Generalized Class

In order to teach the method the order {turn right}, in which {turn} plays the role of a function and {right} plays the role of a parameter, we directly enter the sequence: {^[turn ^»right^]}.

The method recognizes in the sequence the sequences of Reserved Words used and substitutes them with the corresponding class numbers (Nos). The sequence will then be {CR0turn CR1leftCR3} (step 0).

Next, the method identifies in the base (or will create if unknown) the classes {turn} and {right} or C1 and C2, {turn} being the sequence bounded by CR0 and CR1 and {right} being the sequence bounded by CR1 and CR3. The method then identifies in the base (or will create if unknown) the class {turn right} or C3, {turn right} being the sequence of C1+the sequence of C2. Next, the method will also store in the base, for the class C3, its class expression or {C1C2} and its direction, which indicates where the function is found in the expression {C1C2}, in this case "Am" (for upstream) since we have used {^»}, and in {C1C2} the upstream class C1 is the function and hence the downstream class C2 is the parameter.

The example described herein presumes that for the language used the sequence is read from left to right.

This step is performed by the identification-creation step (step 2), whose purpose is to identify in the database, or create if unknown, all the component classes delimited by the classes CR0 through CR3 in the sequence.

Thus, the class C1={turn} is now known to the method as an Upstream function class in C3.

If we now directly enter the sequence {turn left} (without mentioning the reserved classes CR0 through CR3), the method will search this sequence to see if it can find any known functions (step 1/1). It finds in this sequence the previously learned class C1={turn} already known to be an Upstream function class in the class C3. By construction, the method will generalize the role of C1 in C3 by considering that C1 can also be an Upstream function class in {turn left}. Thus, the method itself adds the reserved classes CR0 through CR3 into the sequence as for C3. Our sequence then becomes: (steps 1/2 and 1/3) {^[turn ^»left^]}.

This step is performed by the Dichotomy step (step 1), whose purpose is to insert into the sequence it must process the classes CR0 through CR3 based on the functions known to the method. The method will then continue learning this sequence exactly as above (see step 2).

The database is completed by the sequence C1={turn}, C4={left}, C5={turn left} and C5=={C1C4} with the Direction=Am.

Thus, the method comprises the concatenation of the following steps.

Step 0: preprocessing; step 1: dichotomy; step 2: identification-creation.

The classes C3 and C5 are called "Generalized Classes" or G classes. The concept of generalization consisting of widely replicating a behavior observed in a case taken as an example, in this case the function role that a class can have.

The G classes have in the database, in addition to their simple expression, a class expression, always constituted by two classes, and a direction. The G classes being always constituted by a function and a parameter, the direction will indicate where the function is located in the class expression. If the direction is Am, the function will be at the beginning and the parameter will be at the end, and vice versa.

A G class can be written {^[Function class^»Parameter class^]} for an Upstream G class or {^[Parameter class^-«Function class^]} for a Downstream G class.

The classes CR0={^[ }, CRI={^»}, CR2={^«}, CR3={^]} will be called GI classes (G Indication classes), and they define the G classes in a sequence. Since the function and parameter classes themselves can be G classes, the GI classes make it possible to establish the functional dichotomy of a sequence. This functional dichotomy expresses the way in which the method has understood the sequence.

Of the two elements of a G class, the function will be the one that is applied to the other.

Example: common sense tells us that in {turn right} it is {turn} that is applied to {right} and not the other way around.

The Concept of Dependent Functions

The method knows how to recognize certain functions that make it possible to link two classes.

Hence the sequence: {^[Cx^«^[F0^»Cy^]^]} (1).

In this sequence Cx and Cy are any two classes playing the role of a parameter. These two classes are linked in the sequence by the function F0.

We see that in this sequence:

F0 is an Upstream function in the G class {^[F0^»Cy^]} and the G class {^[F0^»Cy^]} itself is a function, in this case a Downstream function in our sequence (1).

A Class that is a function in one direction whose G classes using this class as a function are also functions but in the inverse direction is characteristic of so-called Dependent Functions or "Dep Functions."

If the method detects a majority of sequences like (1) above for a function F0, then it will generalize this behavior (the role of a function played by F0 and the role of a function with the inverse direction from F0 played by the G classes using F0) and will consider F0 to be a Dep Function.

Which means that:

if F0 is an Upstream Dep function class, then any G class using F0 is automatically a Downstream function class, and conversely:

if F0 is a Downstream Dep function class, then any G class using F0 is automatically an Upstream function class: the inverse sequence of (1) above therefore being: {^[^[Cx^«F0^]^»Cy^]} (2).

Another Example

Let us assume here:

that the Rword {^SETWHEEL} has been initialized, and that no function is known to the method.

If we enter the sequence: {^[turn right^«^[means ^»^SETWHEEL1^]^]}.

The dichotomy step does not modify the sequence (no function is known).

Once this sequence is learned by the identifier-Creator (step 2), the method will know that {means} is an Upstream Dep function and thus, if we then enter: {turn left means ^SETWHEEL-1}.

The dichotomy step recognizes in the sequence the previously learned function {means} (step 1/1) and will insert into this sequence the Reserved Classes CR0 through CR3 corresponding to an Upstream Dep Function situation. Which results in (steps 1/2 and 1/3): {^[turn left^«^[means ^»^SETWHEEL-1^]^]}.

A sequence which is subsequently learned normally by the Identifier-Creator (step 2).

Hereinafter, the term "GDep class" will be used to designate this type of sequence, i.e. one that corresponds to form (1) or (2).

Hereinafter and by convention, the spaces separating the words of a natural language in a sequence are, in a generalized class, always carried exclusively by the function (comprised/included in the expression of the function) and not by the parameter.

Executable Classes and the Reserved Word ^EXE

In order to control a machine, the method must recognize the classes/sequences that must call the routines for controlling the machine.

We have defined in the method the Reserved Word {^EXE}, which is an Upstream function class, in order to make this recognition possible.

By construction, the method considers to be an Executable class:

any C class "tagged" with the Rword ^EXE, indicating that {^[C^«^EXE^]} has been learned; or any G class whose function is tagged with the Rword ^EXE, which means that any G class=^[Fx^»Cx^] or ^[Cx^«Fx^] such as {^[Fx^«^EXE^]} has been learned. These executable G classes have a parameter (or parameter class); or any GDep class whose Dep function is tagged with the Rword ^EXE, which means that any class GDep={^[Cx^«^[Fx^»Cy^]^]} or inverse class such as {^[Fx^«^EXE^]} has been learned. These executable GDep classes have two parameters.

The method has an "Execution" step (step 3/3) that will recognize these classes and execute them.

Another example:

Let us assume that we have connected to the method a small vehicle whose wheels we can turn with a wheel control routine and with the parameter:

{1} to turn the wheels to the right,

{-1} to turn the wheels to the left,

{0} to set the wheels straight, and

^SETWHEEL is assumed to have been initialized in the Reserved Words and linked in the Execution algorithm to the routine for controlling the wheels of the vehicle.

We will establish as an Upstream Function the Rword ^SETWHEEL by entering {^[^SETWHEEL^»1^]}.

We will tag ^SETWHEEL with ^EXE to make the G classes using the function ^SETWHEEL executable. We will then enter: {^[^SETWHEEL^«^EXE^]}.

Thus, the entry of {^SETWHEEL1}:

is understood by the method as {^[^SETWHEEL^»1^]} (step 1), is identified since it has already been created above, i.e. Cx (step 2), and is executed since it is recognized as an executable class (step 3/3).

Because Cx is a G class whose function ^SETWHEEL is "tagged" with ^EXE, the execution step calls the wheel control routine with the parameter {1} which turns the wheels to the right.

Likewise, {^SETWHEEL0} sets the wheels straight and {^SETWHEEL-1} turns the wheels to the left.

The execution step being called by the method, which is itself called after the Dichotomy and the Identification-Creation. The concatenation of steps is thus step 0: preprocessing; step 1: dichotomy; step 2: identification-creation; step 3: application 3, execution 3/3

The Equivalence Functions and the Reserved Word ^EQV

The purpose of the method being to convert an order into an executable sequence, it must identify both the sequences to be converted and their equivalent sequence.

In order to do this, the Reserved Word {^EQV}, a Downstream Function, is defined in the method, making it possible, as before, to "tag" functions. Once tagged with ^EQV a function is recognized by the method as an equivalence function.

In this case, the tagged functions are Dep, thus making it possible to link a sequence to its equivalent sequence. Les G Dep and Equivalence classes will have the following form: {^[C^«^[Feqv^»Ceqv^]^]}, with {^[Feqv^«^EQV^]} being known/learned, wherein Feqv in this case is the Am and Dep and equivalence function, C is the class that can be converted, Ceqv is the class equivalent to C.

The method has an equivalence step that will search the base, for the C classes entered into it, their equivalent class Ceqv (step 3/2).

This algorithm is called in the Application algorithm prior to Execution.

The concatenation of Algorithms thus being the following:

step 0: preprocessing; step 1: dichotomy; step 2: identification-creation; step 3: application 3, equivalent 3/2, execution 3/3.

Example

We must first teach the method an equivalence for a class. Let us continue with the previous example by entering: {^[turn right^«^[means ^»^SETWHEEL1^]^]} (1).

This establishes {means} as an Upstream Dep Function.

We establish {means} as a equivalence Function by "tagging" it with ^EQV

We will therefore enter: {^[means ^«^EQV^]}.

The above sequence (1) is now considered by the equivalence step, and thus by the method, to be a G Dep and Equivalence class.

If we now enter: {turn right}.

The dichotomy step has no effect this time (there is no function in the sequence) (step 1).

The identification-creation step finds the class, because it was created during (step 1) above, i.e., Cy (step 2).

Thus, the sequence is now {Cy} (step 3/1).

The Application/execution step starts the iteration for Cy (step 3/1).

The equivalence step for Cy (step 3/2) is called, and an equivalent class Cx={^[^SETWHEEL^»1^]} is found; the sequence {Cy} is therefore replaced by the sequence {Cx^ [^SETWHEEL^»1^]} (see LGI sequences below).

The application/execution step then resumes for this new sequence.

The Application step starts the iteration for Cx (step 3/1).

The Equivalence step for Cx is called; the Equivalence step does not know any equivalence for Cx (step 3/2).

The Execution step for Cx (3/3) is called, which will turn the wheels to the right!

It then suffices to enter the equivalences: {turn left means ^SETWHEEL-1} and {go straight means ^SETWHEEL0}, in order for the orders {turn left} and {go straight} to be correctly executed.

Details on the Sequences—the GI and LGI Formats

During the various steps 0/1/2, the sequences will evolve. Lets look at how:

In Sequence Preprocessing Step 0:

the sequence received is a "String" (character string), and each character is coded either:

in 8 bits if the method is working in extended ASCII or UTF-8;

in 12 or 16 bits if the method is working in UTF-12 or UTF-16; and more generally, in as many bits as necessary to cover all of the necessary characters of the languages in question.

By construction, in this exemplary application the first classes are reserved for characters. The non-character classes come afterwards. And in order to include in the same sequence both characters and classes (Rwords for example) whose Nos will be found after 255 (in ASCII), the sequence is conventionally binarized in 32 bits for current computers (step 0/1). The maximum number of class thus being ($2^{31}-1$) (class Nos are always positive).

The sequences processed by the method are, at the end of the Sequence Reception (step 0) and thereafter, strings of "Large Integers," the English terminology for "grands entiers" in French.

During preprocessing, the sequences corresponding to reserved words are replaced by their class number Nos.

In Dichotomy Step 1:

The purpose of the Dichotomizer is to insert the GI classes (CR0 through CR3) into the sequence to be processed based on the functions:

already known to the method in the database;

found in the sequence; and not already participating in a G class in the sequence.

Example 1

If the sequence to be processed is {^[turn ^»right^]}, assuming {turn} to be already known as an Upstream function class. The only function class found will be {turn} but it is already participating in a G class, in which it is preceded by CR0={^[ } and followed by CR1={^»}.

Thus, the Dichotomizer cannot process this function and therefore does not modify the sequence.

Example 2

If the sequence to be processed is: {^[turn right^«^[means ^»^SETWHEEL1^]^]} and assuming {turn} and {^SETWHEEL} to be already known as Upstream function classes.

The first function found will be {turn}, which is not participating as a function in a G class and can therefore be processed (step 1/1). The range of its parameter ends at CR2={^«}, so the entity to be processed is the parameter: {turn right}, the interlinking of G classes being prohibited (step 1/2).

The dichotomizer transforms {turn right} into {^[turn ^»right^]} in the sequence (step 1/3).

This gives us the sequence: {^[^[turn ^»right^]^«^[means ^»^SETWHEEL1^]^]}

The Dichotomizer then resumes the function search (step 1/1).

It will find {turn}, which is already expressed and is participating as a function in a G class, and therefore moves on: it will not consider either {means ^SETWHEEL1} or {means}, which at this point are not known as functions (the sequence has not yet been created, this being done in the next step (step 2).

It finds {^SETWHEEL}, which is not expressed and can therefore be processed exactly as before for {turn}.

The entity to be processed this time being the parameter {^SETWHEEL1} (step 1/2).

{^SETWHEEL1} is therefore transformed in the sequence into {^[^SETWHEEL^»1^]} (step 1/3).

The Dichotomizer resumes the function search and will find no more unexpressed functions.

We will then have on output from the Dichotomizer the sequence: {^[^[turn ^»right^]^«^[means ^»^[^SETWHEEL^»1^]^]^]}; this sequence expresses the structure of the corresponding class.

In this example the Dichotomizer has received a sequence already comprising GI classes.

It has nevertheless completed the dichotomy of the sequence submitted to it by going through all the functions known to the method that are present in this sequence.

A sequence comprising the GI classes for all the functions known to the method and present in the sequence will be called a "GI sequence." This sequence format is the output format of the sequences for the Dichotomizer. This will also be the input format of the sequences for the Identification-Creation algorithm.

In Identification-Creation Step 2:

The purpose of the identification-Creation step is either to identify (if known) the component classes of the sequence (delimited by the GI classes), or to create them in the database.

Let us take as the sequence to be processed the previous GI sequence output from the Dichotomizer: {^[^[turn ^»right^]^«^[means ^»^[^SETWHEEL^»1^]^]^]} (1), in which only {turn}, {^SETWHEEL} and {1} are known from the base. In fact, {1} being a character, by construction it is already known ({1} to be the class 49 in the case of extended ASCII or UTF-8).

This GI sequence will gradually be converted, as classes are identified or created, into an LGI sequence in which: the Nos of the G classes will be added into the GI sequence BEFORE their class CR0.

Example: Cz={^[Cx^»Cy^]} will produce the LGI sequence {Cz^[Cx^»Cy^]}. The sequences of the Non-G classes will simply be substituted by their Nos.

Example: if Cx={turn} and Cy={right} in the base for {^[turn ^»right^]} will result in {^[Cx^»Cy^]}.

The "L" in LGI comes from Lead class, the English terminology for "numéro de class en tête" in French. In other words, a "sequence with Lead and G Indication classes." In this format, a sequence itself carries all of the necessary information for its Application/execution (step 3).

A G class can only be created if its Function AND its Parameter are already known in the base—in other words, if a class number No has already been assigned to them. The concatenations of the Dichotomizing step take this into account.

Applied to our sequence (1), this means Start iteration for the class CR0={^[ } in the 1st position in (1) (step 2/1). The G class in the sequence is unknown—if it were actually known we would have a Lead Class {C^[ . . . And its Function and Parameter are unknown in the sequence (again, no lead class for either of the latter). We are therefore in the situation of step 2/7→Return iteration.

Continue iteration for the class CR0={^[ } in the 2nd position in (1) (step 2/1): Here again we are in the situation of step 2/7: an unknown G class in the sequence whose Function and Parameter are also unknown in the sequence→Return iteration.

Continue iteration for the class {t} in the 3rd position in (1) (step 2/1): This is a Non-G class (since not CR0 and not followed by CR0}, unknown in the sequence (since not followed by CR1 or CR2 or CR3).

We are in the situation of step 2/5. Accordingly

Extract the class sequence from the current position (3) to the first CR1 or CR2 or CR3 encountered, i.e. the extracted sequence {turn};

Search the base for this already known sequence, i.e., Cx;

Substitute {turn} with Cx in the sequence, i.e.: {^[^[Cx^»right^]^«^[means ^»^[^SETWHEEL^»1^]^]^]} (2) and Return iteration.

Continue iteration for the class CR1={^»} in the 4th position in (2) (step 2/1): We are in the situation of step 2/2→Return iteration.

Continue iteration for the class {r} in the 5th position in (2) (step 2/1): This is a Non-G class (since not CR0 and not followed by CR0}, unknown in the sequence (since not followed by CR1 or CR2 or CR3).

We are in the situation of step 2/5. Accordingly

Extract the class sequence from the current position (5) to the first CR1 or CR2 or CR3 encountered, i.e. the extracted sequence {right}, Search the base for this sequence—Unknown, therefore created in the base, i.e., Cy;

Substitute {right} with Cy in the sequence, i.e.: {^[^[Cx^»Cy^]^«^[means ^»^(^SETWHEEL^»1^]^]^]} (3); and Return iteration.

Continue iteration for the class CR3={^] } in the 6th position in (3) (step 2/1): We are in the situation of step 2/3. Accordingly, we resume the iteration in the second position—which is the start position of the G class corresponding to CR3 in the sixth position and to the absence of a lead.

Continue iteration for the class CR0={^[ } in the 2nd position in (3) (step 211): We are in the situation of an unknown G class in the sequence (no lead) whose Function and Parameter are known (Cx and Cy)—this is the situation of step 2/6. Accordingly Extract the class sequence=sequence of the Function+ sequence of the parameter, i.e., the class sequence={turn}+{right}={turn right};

identify or (in our case) Create the sequence in the base, i.e., Cz;

insert this No (Cz) upstream from its CR0 in the sequence, i.e., the sequence {^[Cz^[Cx^»Cy^]^«^[means ^»^[^SETWHEEL^»1^]^]^]} (4); and Return iteration for the class following the end of the class Cz, i.e., in the eighth position.

Continue iteration for the class CR2={^«} in the 8th position in (4) (step 2/1): The method continues in the same way and creates all of the necessary classes, constructing the LGI sequence with the form {Cs^[Cz^[Cx^»Cy^]^«Ct^[Cw^»Cu^[CR6^»Cv^]^]^]} with: Cx={turn} Cy={right}, Cz={turn right}=={CxCy}Am, CR6={^SETWHEEL}, Cv={1}, Cu={^SETWHEEL1}=={CR6Cv}Am, Cw={means} Cu={^SETWHEEL1}, Ct={means ^SETWHEEL1}=={CwCu}Am, Cz={turn right}, Ct={means ^SETWHEEL1}, Cs={turn right means ^SETWHEEL1}=={CzCt}Av.

Figure 6:
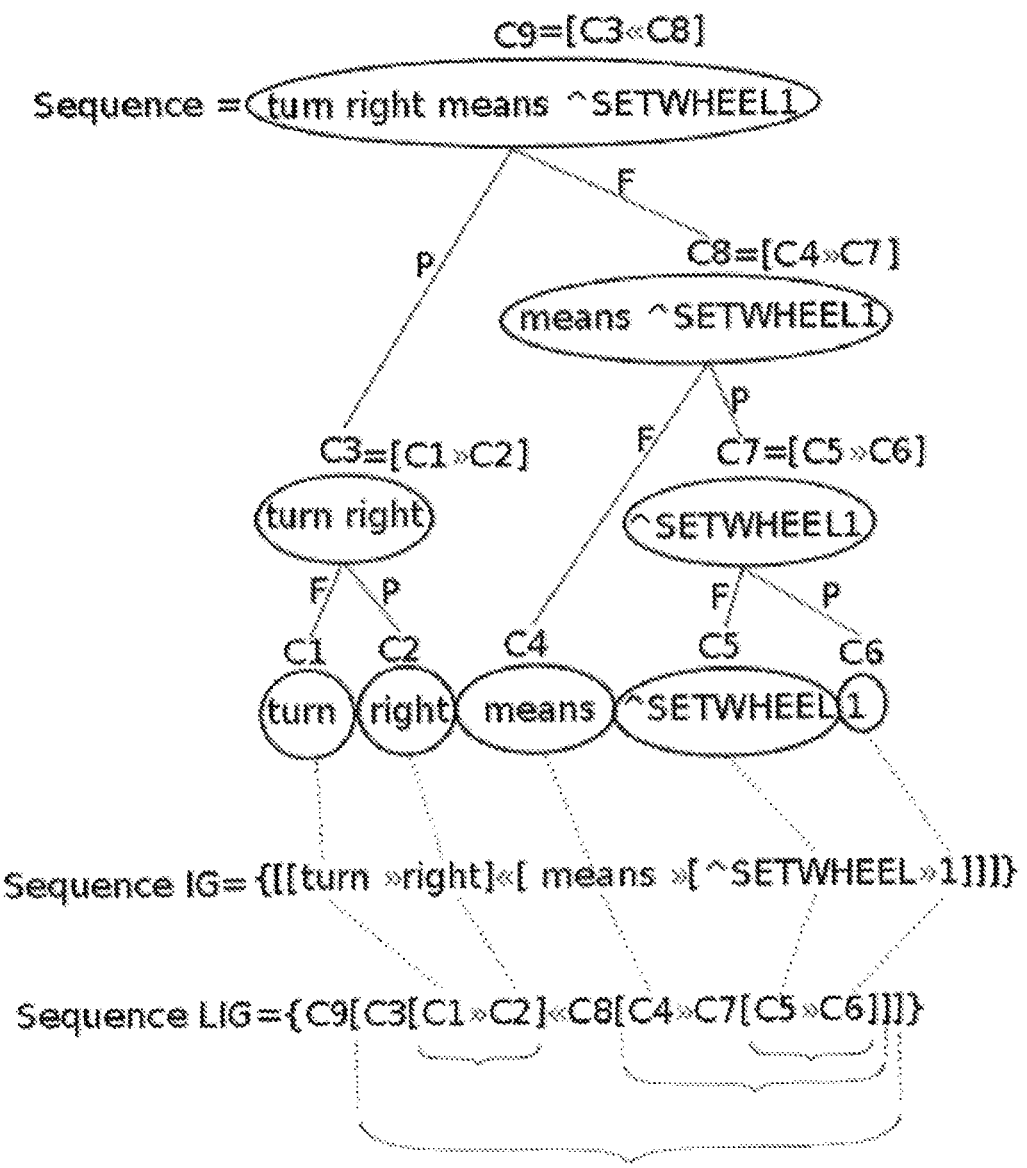
FIG. 6 shows a diagram reconstructing a LGI sequence of a class.

The LGI sequences have the great advantage of linearizing the structure of the classes (see FIG. 6). Thus, an iteration on the classes of an LGI sequence makes it possible to "scan" all the classes involved in the structure, starting with the largest and maintaining chronological order.

It should be noted that the 1st class of an LGI sequence will always be the class No of the sequence! (Cs in the above example).

The LGI Sequences express the way in which the method has learned and understood a sequence.

These sequences are very easy to reconstruct from the database.

Reconstruction of an LGI Sequence of a Class:

We take a class Cs for which we want the LGI sequence (we will reuse the data from the example).

We will start with the sequence {Cs}, iteration on the classes of the sequence (We ignore the GI classes CR0 through CR3):

Process the class in the Xth position (Cs in the 1st position);
Access the base for the class (Cs);
If the class is Non-G→Continue iteration;
If the class is G (Cs is G because it has a class expression and a direction).
We take its class expression and its direction (i.e. {CzCt} and Av);
We insert into this expression the GI classes corresponding to the direction in order to form the class sequence (i.e. {^[Cz^«Ct^]});
We insert into the sequence after the class No this class sequence (i.e. {Cs^[Cz^«Ct^]}); and
Return iteration.
  Process the class in the Xth position (Cz in the 3rd position);
  Access the base for the class (Cz);
  If the class is Non-G→Continue iteration;
  If the class is G (Cz is G).
  We take its class expression and its direction (i.e. {CxCy} and Am);
  We insert into this expression the GI classes corresponding to the direction in order to form the class sequence (i.e. {^[Cx^»Cy^]});
  We insert this class sequence into the sequence after the class No, i.e., {Cs^[Cz^[Cx^»Cy^]^«Ct^]}); and
  Return iteration.
And, so on up to the following LGI sequence: {Cs^[Cz^[Cx^»Cy^]^«Ct^[Cw^»Cu^[CR6^»Cv^]^]^]}.

Boundary Rules:

The dichotomy step, in order to make it possible to consider a function identified in a sequence, must observe the following boundary rules:

an Upstream Non-Dep function must be at the start of the sequence or immediately preceded by CR0={^[ } or by CR1={^»} or by CR2={^«} (One of the first three GI classes); and a Downstream Non-Dep function must be at the end of the sequence or immediately followed by CR1={^»} or by CR2={^«} or by CR3={^]} (One of the last three GI classes).

These rules ensure correct chronology in the dichotomy and avoid interpretation errors.

Example we presume in this case to know that {turn} is an Upstream function. In the sequence {make a U-turn and stop} the function {turn} will not be considered in this sequence because it does not observe the above-mentioned boundary rule.

An Upstream (Dep or non-Dep) function must not be at the end of a sequence or immediately followed by CR1={^»} or by CR2={^«} or by CR3={^]} (One of the last three GI classes).

A Downstream (Dep or non-Dep) function must not be at the start of a sequence or immediately preceded by CR0={^[ } or by CR1={^»} or by CR2={^«} (One of the first three GI classes).

These rules guarantee that the parameter of the function is an existing (non-zero) parameter.

An Upstream function preceded by CR0={^[ } and followed by CR1={^»} is already participating in a G class and therefore will not be considered. The same applies to a Downstream function preceded by CR2={^«} and followed by CR3={^]}.

The Concept of Hierarchy:

The term Hierarchy designates the relationship that can exist between two functions with inverse directions.

Let F1 be an Upstream function, F2 a Downstream function and Pi a parameter, if in the database, there are one (or more) class(es) Ci with the form Ci={^[F1^»^[Pi^«F2^]^]}, then the method deduces from this that there is a dominant hierarchy of F1 over F2. This hierarchy will be written F1>>>F2.

If on the other hand there are one (or more) class(es) Cj in the base with the form Cj={^[^[F1^»Pj^]^«F2^]}, then the method deduces from this that there is a dominant hierarchy of F2 over F1. This hierarchy will be written F1<<<F2.

If simultaneously there are Ni classes with the form Ci and Nj classes with the form Cj, the method takes the most frequently known hierarchy. In other words, if Ni>Nj, the method takes F1>>>F2 and vice versa.

If there is a hierarchy with a function that is a G class of a Dep function, then the method applies the same hierarchy for all other functions that are also G classes of the same Dep function (but with a parameter that may be different).

These hierarchies are directly and essentially useful in the dichotomy of a sequence and enable the dichotomy module to determine the range of the parameter applicable to a function. In fact, the parameter of a non-dominant function cannot contain a function that is dominant over it.

Example

If we have submitted to the method the following sequence: {^[^[turn ^»right^]^«[means ^»^[^SETWHEEL1^]^]]} (5).

The method has therefore learned:
that {turn} is an Upstream function;
that {means} is an Upstream and Dep function;
that there is a hierarchy {turn}<<<{means ^SETWHEEL1} and that there is therefore a hierarchy {turn}<<<{means xxx} wherein xxx is any parameter of {means}; and
that {^SETWHEEL} is an upstream function.

If we then enter the sequence: {turn left means ^SETWHEEL-1}. The dichotomy step finds the function {turn} having as a parameter all or part of {left means ^SETWHEEL-1}. The dichotomy searches for the functions in this parameter and finds {means}, which is an Upstream Dep function for which the G classes are automatically Downstream functions and for which we know an example that is hierarchically dominant over {turn} in the sequence (5).

The method consequently limits the range of the parameter to {left}. After the insertion of the GI classes, the sequence will be: {^[turn ^»left^] means ^SETWHEEL-1}.

The next acceptable function will be {means}, an Upstream function having as a parameter all or part of {^SETWHEEL-1}.

The dichotomy step does not find any downstream Function in this parameter, so it will not limit the range of the parameter and will insert the GI classes, such that {^[turn ^»left^]^[means ^»^SETWHEEL-1^]}. Then, it will resume the function search for this sequence. It will find {^[means ^»^SETWHEEL-1^]}, which is a Downstream function because {means} is an Upstream Dep function. The parameter {^[turn ^>>left^]} being a G class, there is no need to search for a function in this case. Thus, the dichotomy step will insert the following GI classes {ˆ[ˆ[turn ˆ»left^]ˆ«ˆ [means ˆ»ˆSETWHEEL-1ˆ]ˆ]}, and then it will resume the function search and find {ˆSETWHEEL}, an upstream function.

After the insertion of the GI classes, we will have: {ˆ[ˆ[turn ˆ»left^]ˆ«ˆ[means ˆ»ˆ[ˆSETWHEELˆ»-1ˆ]ˆ]ˆ]}, which is the dichotomy of our sequence.

Rules for Updating Classes in the Identifier-Creator

Each simple sequence (comprising only characters, and not comprising any GI sequences) must be present only once in the database. Thus, each simple sequence is represented by a single unique class No in the database. In order to maintain this principle of uniqueness, the identification-creation module observes the following rules:
- the class to be created is G and known as Non-G→The class is updated by the addition of its class expression and its direction,
- the class to be created is Non-G and known as G→no update to be performed, the class remains G in the database,
- the class to be created is G and known as G in a different form (the direction and/or the function and the parameter are different)→the class expression and the direction are updated (the new version is dominant over the old one),
- the class to be created (G or Non-G) is known in the same form→No update to be performed, and
- the class to be created (G or Non-G) is unknown in the database→Create the new class.

Correcting Comprehension Failures

In certain cases, (absence of a function definition, no defined hierarchy, etc.), the dichotomy step may establish a faulty dichotomy for a sequence. In that event, the sequence need only be re-entered, indicating the GI classes in connection with what must be understood. The sequence will then be corrected.

Exemplary Application

For this example, we will return to the control of a small vehicle introduced above and develop it further. We will start with a blank base and display the status of the base in each step.

a) Initialization of the Base

In the case of Reserved Words:

| No  | simple expression | Class expression | direction |
|-----|-------------------|------------------|-----------|
| CR0 | ˆ[                |                  |           |
| CR1 | ˆ»                |                  |           |
| CR2 | ˆ«                |                  |           |
| CR3 | ˆ]                |                  |           |
| CR4 | ˆEXE              |                  |           |
| CR5 | ˆEQV              |                  |           |
| CR6 | ˆSETWHEEL         |                  |           |
| CR7 | ˆSETENGINE        |                  |           | b) Control of the Wheels

Establish ˆSETWHEEL as an Upstream function: {ˆ[ˆSETWHEELˆ»1ˆ]}.

| No | simple expression | Class expression | direction |
|----|-------------------|------------------|-----------|
| C1 | 1                 |                  |           |
| C2 | ˆSETWHEEL1        | CR6C1            | Am        |

Establish ˆSETWHEEL as an Executable Function: {ˆSETWHEELˆ«ˆEXEˆ]}.

| No | simple expression | Class expression | direction |
|----|-------------------|------------------|-----------|
| C3 | ˆSETWHEELˆEXE     | CR6CR4           | Av        |

Establish {means} as an Equivalence: {ˆ[means ˆ«ˆEQVˆ]}.

| No | simple expression | Class expression | direction |
|----|-------------------|------------------|-----------|
| C4 | means             |                  |           |
| C5 | means ˆEQV        | C4CR5            | Av        |

Teach the Equivalences:

(i) For turning the wheels to the right: {ˆ[turn rightˆ«ˆ [means ˆ»ˆSETWHEEL1ˆ]ˆ]}.

| No | simple expression | Class expression | direction |
|----|-------------------|------------------|-----------|
| C6 | means ˆSETWHEEL1  | C4C2             | Am        |
| C7 | turn right        |                  |           |
| C8 | turn right means ˆSETWHEEL1 | C7C6   | Av        |

(ii) For turning the wheels to the left: {turn left means ˆSETWHEEL-1}.

| No  | simple expression | Class expression | direction |
|-----|-------------------|------------------|-----------|
| C9  | -1                |                  |           |
| C10 | ˆSETWHEEL-1       | CR6C9            | Am        |
| C11 | meansˆSETWHEEL-1  | C4C10            | Am        |
| C12 | turn left         |                  |           |
| C13 | turn left means ˆSETWHEEL-1 | C12C11 | Av       |

(iii) To set the wheels straight: {go straight means ˆSETWHEEL0}.

| No  | simple expression | Class expression | direction |
|-----|-------------------|------------------|-----------|
| C14 | 0                 |                  |           |
| C15 | ˆSETWHEEL0        | CR6C14           | Am        |
| C16 | means ˆSETWHEEL0  | C4C15            | Am        |
| C17 | go straight       |                  |           |
| C18 | go straight means ˆSETWHEEL0 | C17C16 | Av     |

IC Control of the Engine

This time we will use the Rword ˆSETENGINE, an Upstream Function whose parameters are {1} for forward, {0} for stop, {-1} for reverse.

ˆSETENGINE is linked in the execution step to the control of the engine.

The corresponding orders are: {go ahead} for forward, {stop} for stop, and {move back} for reverse.

Establish ˆSETENGINE as an Upstream Function: {ˆ[ˆSETENGINEˆ»1ˆ]}

| No  | simple expression | Class expression | direction |
|-----|-------------------|------------------|-----------|
| C19 | ˆSETENGINE1       | CR7C1            | Am        |

Establish ˆSETENGINE as an Executable Function: {ˆ[ˆSETENGINEˆ«ˆEXEˆ]}

| No | simple expression | Class expression | direction |
|---|---|---|---|
| C20 | ˆSETENGINEˆEXE | CR7CR4 | Av |

Teach the Equivalences:
(i) For setting the engine in forward: {go ahead means ˆSETENGINE1}.

| No | simple expression | Class expression | direction |
|---|---|---|---|
| C21 | means ˆSETENGINE1 | C4C19 | Am |
| C22 | go ahead | | |
| C23 | go ahead means ˆSETWHEEL1 | C22C21 | Av |

(ii) For setting the engine in reverse: {move back means ˆSETENGINE−1}.

| No | simple expression | Class expression | direction |
|---|---|---|---|
| C24 | ˆSETENGINE−1 | CR7C9 | Am |
| C25 | means ˆSETENGINE−1 | C4C19 | Am |
| C26 | move back | | |
| C27 | move back means ˆSETENGINE−1 | C26C25 | Av |

(iii) For stopping the engine: {stop means ˆSETENGINE0}

| No | simple expression | Class expression | direction |
|---|---|---|---|
| C28 | ˆSETENGINE0 | CR7C14 | Am |
| C29 | means ˆSETENGINE0 | C4C28 | Am |
| C30 | stop | | |
| C31 | Stop means ˆSETENGINE0 | C30C29 | Av |

At this point we have therefore taught the method to execute the necessary orders for controlling our vehicle, i.e.: turn right, turn left, go straight, go ahead, move back, and stop.

Equivalent Orders

In this case we want to have synonyms for certain orders, for example, we want the method to correctly understand the order {make a right}. To achieve this, we could simply enter {make a right means ˆSETWHEEL 1} which will work.

Instead, we will enter the equivalence: {make a right means turn right}.

Once this equivalence is learned in the usual way, we will be able to enter {make a right}:
  the method calls the equivalence function for this sequence, which finds the equivalent class {turn right}, and continues;
  the equivalence function then finds {ˆSETWHEEL1} and then resumes the method; and
  once the equivalence function finds no further equivalences, the method moves on to the execution step and turns the wheels to the right.

This order will then be executed by the machine.

In a variant, according to one example, the identification-creation step is performed at the same time as the dichotomy step.

Returning to FIG. 6, this figure shows an exemplary class C9 and classes involved in the structure of the class C9. The figure shows the relationships between the classes once the processing operations are completed. The simple expressions are indicated in the bubbles. P indicates a parameter. F represents the function.

| No | simple expression | Class expression | direction |
|---|---|---|---|
| C1 | turn | | |
| C2 | right | | |
| C3 | turn right | C1C2 | Am |
| C4 | means | | |
| C5 | ˆSETWHEEL | | |
| C8 | 1 | | |
| C7 | ˆSETWHEEL1 | C5C6 | Am |
| C8 | means ˆSETWHEEL1 | C4C7 | Am |
| C9 | turn right means ˆSETWHEEL1 | C3C8 | Av |

Details and Examples of Hierarchies

A function class is also just called a function. A parameter class is also just called a parameter.

The principle of dichotomy is that the hierarchical relationships between two functions make it possible to dichotomize a sequence.

Case 1—Assuming an upstream function precedes a downstream function in the sequence: If the System knows of a simple hierarchy between these two functions→the System applies this hierarchy (inserts the corresponding GI classes into the sequence).

Example 1

The case of a known hierarchy in the table of hierarchical relationships, we take a database in which it is known of the following elements that: {turn} is an upstream function; {quickly} is a downstream function; and the hierarchical relationship: {turn}<<<{quickly} (the function {quickly} is dominant over the function {turn}).

The sequence {turn right quickly} is entered.

In the dichotomy step b), the upstream function {turn} is recognized to be correctly bounded and can therefore be considered.

A search is then conducted for the range of its parameter, which begins with "r."

The downstream function {quickly} is then recognized to be hierarchically dominant over {turn}.

Thus, the parameter ends with the previous "t" {quickly} and the function {turn} has precedence over the function {quickly} in the adoption of the parameter {right}. The corresponding GI are inserted into the sequence {ˆ[turn ˆ»rightˆ] quickly}, and then the algorithm continues. The only correctly bounded function not yet processed in the sequence is {quickly}. There is no hierarchical interaction with another function, and its parameter begins at the start of the sequence and ends in the position preceding {quickly}. Thus, the following GI are inserted: {ˆ[ˆ[turn ˆ»rightˆ]ˆ"quicklyˆ]}.

Example 2

The case of an unknown hierarchy in the table, we use the evaluation of a hierarchy. We take a database in which there are three known sequences: S1={ˆ[ˆ[turn ˆ»northˆ] ˆ"quicklyˆ]}, S2={ˆ[ˆ[turn ˆ»southˆ]ˆ]ˆ"quicklyˆ]} and S3={ˆ[turn ˆ»ˆ[leftˆ"quicklyˆ]ˆ]}.

From these three sequences, the System knows that: {turn} is an upstream Function; and {quickly} is a downstream Function.

The sequence {turn right quickly} is entered.

During the dichotomy step b) and exactly as in Example 1 herein, the two functions {turn} and {quickly} are recognized, but the lack of a hierarchical relationship between these two functions in the table requires the system (or method) to evaluate it. The number of recurrences for both functions is therefore counted, i.e., N12=1 (corresponding to S3) and N21=2 (corresponding to S1 and S2), thus indicating that, since N21>N12, then {turn}<<<{quickly}, and just as in Example 1 herein, the GI such as {^[^[turn ^»right^] ^"quickly^]} are inserted into the sequence.

If the system (or method) does not know any simple hierarchy between these two functions, and at least one (or both) of the functions are ParDep functions, then the system will search for the hierarchy of:
   the upstream function, if the latter is not a ParDep function;
   the lists of upstream ParDep functions of the upstream function, if the latter is a ParDep function;
   and/versus
   the downstream function, if the latter is not a ParDep function;
   the list of downstream ParDep functions of the downstream function, if the latter is a ParDep function.
If the system finds a hierarchy→The system applies the found hierarchy.

Example 3

The case of an unknown Hierarchy of an upstream Function versus a downstream ParDep function: use the lists of ParDep functions of a Dep function used in a ParDep function. We take a database in which it is known of the following elements that: {means} is an upstream Dep Function; S4={^[means ^»^SETWHEEL1^]}; and S5={^[^[turn ^»left^]^«^[means ^»^SETWHEEL-1^]^]}.

The System therefore knows that: {turn} is an upstream function; and S4 is a downstream ParDep function. Let S6={^[means ^»^SETWHEEL-1^]} be a downstream ParDep function.

The System knows of no direct/simple hierarchical relationship of {turn} versus {means ^SETWHEEL1}, and {turn right means ^SETWHEEL1} is entered.

During the dichotomy step b), the upstream function {turn} will be processed because it is correctly bounded (the GI classes). During the search for the range of its parameter, the downstream function S4={means ^SETWHEEL1} is found, but so is the upstream Dep function {means}, both of them correctly bounded. The function S4, being a generalized class using {means}, will take priority over the latter in the processing in the absence of any knowledge of a hierarchical relationship between these two functions. Since S4 is a ParDep function, the hierarchical relationship of {turn} versus the list of ParDep functions the Dep function {means}, i.e., S4 and S6, is evaluated. The generalized class S5 gives us an occurrence such as {turn}<<<S6, so this hierarchy will be applied and {turn} will therefore take precedence in the adoption of the parameter {right} and ultimately, the system/method will obtain: {^[^[turn ^»right^] ^«^[means ^»^SETWHEEL1^]^]}.

If the system still does not find a hierarchy, the system will then search for the hierarchy of: the list of upstream functions related to the upstream function; and/versus the list of downstream functions related to the downstream function. If the System then finds a hierarchy→the System applies the found hierarchy.

Case 2—Upstream function preceding an upstream Dep function in the sequence: Only functions with inverse directions can interact with each other hierarchically, so in the hierarchical evaluation, the upstream Dep function will be substituted by the list of downstream ParDep functions of this upstream Dep function. This corresponds to an anticipation in the sequence of a future downstream ParDep function of the upstream Dep function that will appear during the dichotomy.

Example 4

The case of an unknown Hierarchy of an upstream Function Versus an upstream Dep Function: use the lists of ParDep functions. We take a database in which it is known of the following elements that: {means} is an upstream Dep Function Dep; and S5={^[^[turn ^»left^]^«^[means ^»^SETWHEEL-1^]^]}. The System therefore knows that: {turn} is an upstream function. Let S6={^[means ^»^SETWHEEL-1^]} be an upstream ParDep function, and {turn right means ^SETWHEEL1} is entered.

During the dichotomy step b) the upstream function {turn} will be processed because it is correctly bounded During the search for the range of its parameter, the upstream Dep function {means} is found, the hierarchical relationship of the function {turn} versus the ParDep function list of {means}, i.e., S6, is then evaluated. The generalized class S5 gives us an occurrence such as {turn}<<<S6. Therefore, {turn} will take precedence in the adoption of the parameter {right} and the following GI will be inserted {^[turn ^»right^] means ^SETWHEEL1}. The next function to be processed is the function {means}, which is an upstream function. Since there are no other functions with which it can interact hierarchically, its parameter will begin at ^SETWHEEL and end at the end of the sequence. The following GI is then inserted: {^[turn ^»right^]^[means ^»^SETWHEEL1^]}. The last function to be processed is the downstream ParDep function {^[means ^»^SETWHEEL1^]}. After the insertion of the GI classes and ultimately, the system/method will obtain: {^[^[turn ^»right^]^«^[means ^»^SETWHEEL1^]^]}.

Example 5

The case of an unknown Hierarchy of an upstream Function versus an upstream Dep Function: use related functions for the hierarchical evaluation: {means} as an upstream Dep function {signifies} as an upstream Dep function; and the hierarchical relationship {turn}<<<{means}. Two sequences: S7={^[means^"' is a verb of equivalence^]} and S8={^[signifies^"' is a verb of equivalence^]}, and {turn right signifies ^SETWHEEL1} is entered.

During the dichotomy step b) the upstream function {turn} will be processed because it is correctly bounded. During the search for the range of its parameter, the upstream Dep function {signifies} is found. The hierarchical relationship of the function {turn} versus the list of ParDep functions of {signifies} is then evaluated. The list being empty, there is therefore no hierarchy via this mode, so the related functions of {signifies} are searched. The system/method will then find via S7 and S8, the function {means}, and will then search for the hierarchy of {turn} versus {means}, which the system/method knows to be {turn}<<<{means}. Thus, {turn} will take precedence in the adoption of the parameter {right} and ultimately, the system/method will obtain: {^[^[turn ^»right^]^«^[means ^»^SETWHEEL1^]^]}.

This feature is nonlimiting and can even be expanded. It is possible, for example, if no hierarchies are found at the end of the preceding concatenations, to expand the list of related functions obtained previously by all the functions related to this list, then resume the hierarchical evaluations, and so on.

There is a compromise to be made between the processing times linked to the hierarchical evaluations and the acceptable comprehension error in the system/method.

The invention claimed is:

1. A computer-implemented method for transforming a sequence comprising a plurality of words from a natural language to an executable sequence in real-time to control a machine, comprising steps of:

a) preprocessing the sequence comprises:

comparing the sequence to data from a database comprising classes, the sequence is constituted by several characters forming the words from the natural language, wherein each class comprises at least first two of the following elements: a number; an expression constituted by a character string representing the class; a class expression composed of two numbers corresponding to two other classes, either positioned in a first position, or positioned in a second position; and a direction, the direction being either upstream or downstream;

wherein a generalized class being a class comprising the class expression and the direction, an upstream generalized class has an upstream direction and a downstream generalized class has a downstream direction;

for the upstream generalized class, the class in a first position of its class expression is an upstream function class and the class in a second position of its class expression is a parameter class;

for the downstream generalized class, the class in a first position of its class expression is a parameter class and the class in a second position of its class expression is a downstream function class;

a function class is at least one of the following elements: an upstream function class, and a downstream function class, defining a Dep function table of specific upstream or downstream function classes called Dep function classes, a Dep function class is either an upstream Dep function class or a downstream Dep function class, the Dep function classes present in the Dep function table have a characteristic that any generalized class of any of the Dep function classes is known to be a function class in an inverse direction from the Dep function class, called a ParDep function class, thus an upstream ParDep function class is an upstream function class and is a generalized class of a downstream Dep function class; and a downstream ParDep function class is a downstream function class and is a generalized class of an upstream Dep function class;

defining a hierarchical table of hierarchical relationships for pairs constituted by an upstream function class or a Dep function class and by a downstream function class or a Dep function class, the hierarchical relationship indicating, for each of the pair present in the hierarchical table, which of the two function classes of the pair is hierarchically dominant over the other;

for a sequence with an upstream function class preceding a downstream function class or a hierarchically dominant Dep function class, and the function classes are separated by a non-empty parameter, a non-hierarchically dominant upstream function class has precedence in an adoption of a parameter over the downstream function class or the hierarchically dominant Dep function class;

for the sequence with a downstream function class coming after an upstream function class or a hierarchically dominant Dep function class, and the function classes are separated by a non-empty parameter, a non-hierarchically dominant downstream function class has precedence in the adoption of the parameter over the upstream function class or the hierarchically dominant Dep function class;

wherein the database also comprises reserved classes, each reserved class comprising a number and an expression, each expression of the reserved class is preceded by a tag (^), and the following predefined elements: a first reserved class (^[), a second reserved class (^»), a third reserved class(^«), a fourth reserved class (^]) and a fifth reserved class (^EXE);

defining the first reserved class (^[), the second reserved class (^»), the third reserved class (^«) and the fourth reserved class (^]) as GI classes;

a function of the first reserved class (^[) and the fourth reserved class (^]) indicating in the sequence a start and an end of the generalized class, the second reserved class(^»), always positioned inside a part of the sequence delimited by the first reserved class (^[) and the fourth reserved class(^]), separating the part of the sequence into two subparts, a first subpart representing the upstream function class and a second subpart representing the parameter class, and indicating that the part of the sequence represents the upstream generalized class;

the third reserved class (^«), always positioned inside the part of the sequence delimited by the first reserved class (^[) and the fourth reserved class(^]), separating the part of the sequence into two subparts, a first subpart of the third reserved class representing the parameter class and a second subpart of the third reserved class representing a downstream function class, and indicating that the part of the sequence represents the downstream generalized class;

defining the sequence or sequence part comprising the GI classes as a GI expression;

the fifth reserved class (^EXE) is a function class and designates any class as executable by a machine, in response to recognition of a reserved class in the part of the sequence, substituting the part of the sequence by a number of the corresponding reserved class;

b) dichotomy by searching the sequence for the expressions and the GI expressions known to be the upstream function class or the downstream function class, the sequence is dichotomized until all the function classes contained in the sequence are dichotomized; wherein for each of the upstream function classes or downstream function classes found in the sequence, the dichotomy step comprises:

for an upstream function class, that is Non-Dep, at the beginning of the sequence or immediately preceded by one of the first three GI classes (^[, ^», ^«), and the upstream function is not at the end of the sequence and not immediately followed by one of the last three GI classes (^», ^«, ^]), then a part of the sequence playing a role of a parameter class for the upstream function class is identifiable, the parameter class, adjacent to the upstream function class, starts in a position following the upstream function class and an end position of the parameter class is identifiable by going through positions of the sequence beginning at a start position of the parameter class, and is either:
  in a position preceding the expression or the GI expression of a downstream function class or a Dep function class, and hierarchically dominant over the upstream function class; or
  in a position preceding one of the last three GI classes (^», ^«, ^]) and an analysis resumes in a position following the fourth reserved class (^]) corresponding to the first reserved class (^[) found in one position; or
  at the end of the sequence;
in response to a determination of the end position of the parameter class and the start and end positions of the parameter class are different, the following are inserted into the sequence:
  the first reserved class (^[) in a position preceding the upstream function class;
  the second reserved class (^») between the end of the upstream function class and the start of the parameter class;
  the fourth reserved class (^]) at the end of the parameter class; and
  wherein the insertion of the first, second and fourth reserved GI classes defines in the sequence an upstream Generalized class;
for a downstream function class, that is Non-Dep, at the end of the sequence or immediately followed by one of the last three GI classes (^», ^», ^]) and the downstream function is not at the start of the sequence and not immediately preceded by one of the first three GI classes (^[, ^», ^«), then a part of the sequence playing the role of a parameter class for the downstream function class is identifiable, the parameter class, adjacent to the downstream function class, ends in a position preceding the downstream function class and a start position of the parameter class is identifiable by going backward through the positions of the sequence, beginning at the end position of the parameter class, and is either:
  in the position following the expression or GI expression of an upstream function class or Dep function class, and hierarchically dominant over the downstream function class; or
  in the position following one of the first three GI classes (^[, ^», ^«), and the analysis resumes in the position preceding the first reserved class (^[) corresponding to the fourth reserved class (^]) found in one position; or
  at the start of the sequence,
in response to a determination of the end position of the parameter class, and the start and end positions of the parameter class are different, the following are inserted into the sequence:
  the first reserved class (^[) immediately before the parameter class;
  the third reserved class (^«) between the end of the parameter class and the start of the downstream function class;
  the fourth reserved class (^]) at the end of the downstream function class; and
  wherein the insertion of the first, third and fourth reserved GI classes defines in the sequence a downstream Generalized class;
  wherein the dichotomy step b) allows nesting Generalized classes;
c) identification-creation, wherein
  all the function classes and all the parameter classes that are not generalized classes are substituted in the sequence by their class number; and
  the class number of the generalized class is inserted immediately before the first reserved class (^[) of each of the generalized classes;
  for each generalized class contained in the sequence:
    the function class is stored in the database with at least following two pieces of information: a new number and the expression, in response to a determination that an expression defining the function class is unknown;
    the parameter class is stored in the database with at least following two pieces of information: the new number and the expression, in response to a determination that an expression defining the parameter class is unknown; and
    the Generalized class is stored in the database with following information: the new number, the expression, a class expression and a direction, in response to a determination that an expression defining the Generalized class is unknown;
  for a part of the sequence that is not a generalized class and is unknown, the part of the sequence is stored in the database with at least following two pieces of information: a new number and the simple expression;
  wherein the sequence obtained is called the LGI expression of the sequence, thereby transforming the sequence comprising the plurality of words from the natural language to the executable sequence in real-time, without compilation, to control the machine.

2. The method according to claim 1, further comprising a step of executing the executable sequence by iterating from the first to the last classes of the sequence, the GI classes are ignored, each executable class is executed by the machine, a remaining iteration resumes at the end of the executable class, wherein an executable class is defined as: a parameter class linked to the fifth reserved class (^EXE) in the generalized class; a Generalized class whose function class is the executable class; and a Generalized class whose function class is a ParDep function class of a Dep function class that is the executable class.

3. The method according to claim 1, wherein updating of the Dep function table in the dichotomy step b) is determined based on the following conditions:
  the upstream function class is determined to be an upstream Dep function class in response to an application of the upstream function class to a first upstream number corresponding to a number of recurrences of the upstream function class of the upstream Generalized classes of the database, to an application of the upstream function class to a second upstream number corresponding to a number of recurrences of the Generalized classes that are downstream function classes, and the second upstream number is at least greater than half of the first number; and
  the downstream function class is determined to be a downstream Dep function class in response to an application of the downstream function class to a first downstream number corresponding to a number of recurrences of the downstream function class of the downstream Generalized classes of the database, to an application of the downstream function class to a second downstream number corresponding to a number of recurrences of the Generalized classes that are upstream function classes, and the second downstream number is at least greater than half of the first number.

4. The method according to claim 1, wherein the upstream function class is applied to an upstream number corresponding to a number of recurrences of the upstream function class of the upstream Generalized classes of the database in which the parameter classes are downstream Generalized classes whose function is the downstream function class;
- wherein the downstream function class is applied to a downstream number corresponding to a number of recurrences of the downstream function class of the downstream Generalized classes of the database in which the parameter classes are upstream Generalized classes whose function is the upstream function class;
- wherein in the dichotomy step b), in response to a determination that the upstream function class is earlier in the sequence than the downstream function class, the hierarchical relationship between the upstream function class and the downstream function class is evaluated as follows:
  - if the upstream number is greater than the downstream number, then the upstream function class is hierarchically dominant over the downstream function class; or
  - if the downstream number is greater than the upstream number, then the downstream function class is hierarchically dominant over the upstream function class; or
  - otherwise, there is no hierarchical relationship between the upstream function class and the downstream function class.

5. The method according to claim 4, the dichotomy step b) further comprises steps of:
- obtaining an upstream list number based on the upstream numbers for each of the pairs constituted by an upstream function class belonging to an upstream function class list and a downstream function class belonging to a downstream function class list;
- obtaining the downstream list number being obtained based on the downstream numbers for said each of the pairs constituted by the upstream function class belonging to the upstream function class list and the downstream function class belonging to the downstream function class list;
- defining a hierarchical relationship between the upstream function class list and the downstream function class list as follows:
  - if the upstream list number is greater than the downstream list number, then the upstream function class list is hierarchically dominant over the downstream function class list; or
  - if the downstream list number is greater than the upstream list number, then the downstream function class list is hierarchically dominant over the upstream function class list; or
  - otherwise, there is no hierarchical relationship between the upstream function class list and the downstream function class list; and
- in response to a determination that (a) the upstream function class is earlier in the sequence than the downstream function class, (b) there is no direct hierarchical relationship between the upstream function class and the downstream function class and (c) either or both of the upstream function class and the downstream function class are ParDep function classes, evaluating a hierarchical relationship of the list of upstream ParDep function classes of a same downstream Dep function class of the upstream function class if the upstream function class is a ParDep function class and of the list of downstream ParDep function classes of the same upstream Dep function class of the downstream function class if the downstream function class is a ParDep function class.

6. The method according to claim 5, wherein the dichotomy step b) further comprises steps of:
- evaluating the hierarchical relationship of the upstream function class and the list of all the downstream ParDep function classes of the upstream Dep function class in response to determination that the upstream function class is earlier in the sequence than the upstream Dep function class;
- for the upstream function, the determination of the end position of the parameter of the upstream function includes a position preceding the expression of an upstream Dep function class that is hierarchically dominant over the upstream function class;
- evaluating the hierarchical relationship of the downstream function class and the list of all the downstream ParDep function classes of the downstream Dep function class in response to determination that the downstream function class is later in the sequence than the downstream Dep function class; and
- for the downstream function, the start position of the parameter of the downstream function is in a position following the expression of a downstream Dep function class that is hierarchically dominant over the downstream function class.

7. The method according to claim 1, wherein the identification-creation step c) further comprises a step of updating the class expression and direction of known generalized class.

8. The method according to claim 3, wherein the second upstream number is at least greater than two thirds of the first upstream number; and wherein the second downstream number is at least greater than two thirds of the first downstream number.

9. The method according to claim 1, in response to a finding of a function class in the sequence with the GI expression containing other function class, the dichotomy step b) further comprises a step of processing the function class with the GI expression containing the other function classes before the other function classes.

10. The method according to claim 2, wherein the database further comprises a sixth reserved class (^EQV), the sixth reserved class (^EQV) being a downstream function class and designating any Dep function class as an equivalence function in response to a determination that the Dep function class is the parameter class in a generalized class whose function is the sixth reserved class (^EQV), thus any parameter class of a generalized class whose function is the ParDep function class of a Dep and equivalence function class has as an equivalent class, the parameter class of the Dep function class in the generalized ParDep function class;
- wherein the execution step d), in response to determination that there is a known generalized class for a class found in the sequence, whose parameter is the class and whose function is a ParDep function class of the Dep and equivalence function class, further comprises steps of substituting the LGI expression of the class in the sequence with the LGI expression of an equivalent class; and resuming the iteration at the start of the class;

wherein the LGI expression of the equivalent class starts with a number of the class and is obtained through iteration by having all of the numbers of the generalized classes of the LGI expression of the class followed by a number of the first GI class, then by a number of the first class of the class expression of the generalized class, then by a number of the second GI class if the class is an upstream generalized class or by the number of the third GI class if the class is a downstream generalized class, then by a number of the second class of the class expression of the generalized class, then by a number of the fourth GI class.

11. The method according to claim 6, wherein the dichotomy step b), in response to a determination that there is no hierarchical relationship between two function classes, further comprises, for each of the two function classes, steps of searching a list of related function classes in the database; comparing a recurrence of each function class to evaluate the hierarchy between the two lists; and defining the list of classes related to a class as the list of classes that are a parameter class within generalized classes, the function classes of which are applied to the class within a generalized class.

12. The method according to claim 1, wherein the pre-processing step a), in response to a location of the reserved class tag (^) followed by a number, further comprises a step of substituting the expression (^+numéro) in the sequence by the number of the class with a same number.

* * * * *